United States Patent
Hillinger et al.

(10) Patent No.: US 7,544,025 B2
(45) Date of Patent: Jun. 9, 2009

(54) DOUBLE-SPINDLE MACHINE TOOL

(75) Inventors: Alfred Hillinger, Murr (DE); Hubert Bruder, Ludwigsburg (DE)

(73) Assignee: Cross Hüller GmbH, Ludwigsburg (DE)

(*) Notice: Subject to any disclaimer, the term of this patent is extended or adjusted under 35 U.S.C. 154(b) by 663 days.

(21) Appl. No.: 11/353,575

(22) Filed: Feb. 14, 2006

(65) Prior Publication Data

US 2006/0182506 A1    Aug. 17, 2006

(30) Foreign Application Priority Data

Feb. 16, 2005   (EP)   ................... 05003226
Nov. 18, 2005   (EP)   ................... 05025278

(51) Int. Cl.
*B23B 39/16*   (2006.01)
(52) U.S. Cl. .............. 408/13; 408/43; 408/53; 408/91
(58) Field of Classification Search .......... 408/4, 408/13, 8, 31, 42, 43, 46, 53, 72 R, 87, 88, 408/91; 409/203; 269/291, 303, 309; *B23B 39/16; B23C 1/04, 1/08*
See application file for complete search history.

(56) References Cited

U.S. PATENT DOCUMENTS

| | | | | |
|---|---|---|---|---|
| 2,651,975 A * | 9/1953 | Soloff | .......................... | 409/184 |
| 3,442,175 A * | 5/1969 | Heap et al. | .................... | 409/136 |
| 3,622,145 A * | 11/1971 | Gibson | ........................ | 269/297 |
| 3,746,459 A * | 7/1973 | Kindelan | ...................... | 408/37 |
| 3,890,057 A * | 6/1975 | Kindelan | ...................... | 408/43 |
| 4,443,928 A * | 4/1984 | Kielma | ........................ | 483/46 |
| 4,559,681 A * | 12/1985 | Coquillart et al. | ........... | 29/26 A |
| 5,105,694 A | 4/1992 | Smith et al. | | |
| 5,980,172 A * | 11/1999 | Shoda | ........................ | 409/203 |
| 6,071,220 A | 6/2000 | Sugihara et al. | | |
| 6,619,641 B2 | 9/2003 | Heitzmann et al. | | |

FOREIGN PATENT DOCUMENTS

| | | |
|---|---|---|
| DE | 19859360 | 7/2000 |
| EP | 03 023 017.1 | 7/1989 |
| EP | 0 806 998 B1 | 11/1997 |
| EP | 1260304 | 5/2001 |
| EP | 1524068 | 10/2003 |
| JP | 58022610 A * | 2/1983 |
| JP | 62094202 | 3/2006 |
| WO | WO2004/067223 | 8/2004 |
| WO | WO 2004/067223 | 8/2004 |
| WO | WO 2004/091852 | 10/2004 |

* cited by examiner

*Primary Examiner*—Daniel W Howell
(74) *Attorney, Agent, or Firm*—McGlew and Tuttle, P.C.

(57) ABSTRACT

A double-spindle machine tool comprises two tool-holder spindles and two work holding fixtures allocated thereto. A work holding fixture comprises a work carrier plate which supports itself on an adjustable abutment. This abutment is adjusted by means of an adjusting device in dependence on changes in the distance of the axes of rotation of the tool-holder spindles.

18 Claims, 9 Drawing Sheets

DOUBLE-SPINDLE MACHINE TOOL

BACKGROUND OF THE INVENTION

1. Field of the Invention

The invention relates to a double-spindle machine tool, comprising a frame; two tool-holder spindles, which have parallel axes of rotation that are disposed at a distance from one another; two work holding fixtures for accommodation of a respective work; devices for displacement of the works relative to the tool-holder spindles.

2. Background Art

Double-spindle machine tools are generally known, for example from WO 2004/067223 A1. A fundamental problem with these double-spindle machine tools resides in that the distance between the axes of rotation of the tool-holder spindles cannot be kept accurately. On the one hand this is due to the fact that the spindles cannot be aligned one in relation to the other with absolute accuracy. On the other hand this is rather substantially caused by the fact that the distance of the tool-holder spindles changes under the action of numerous temperature influences for example by the machine or due to the ambience.

SUMMARY OF THE INVENTION

It is an object of the invention that changes in distance of the axes of rotation of the tool-holder spindles can be compensated by comparatively simple means even during operation of the machine.

According to the invention, this object is attained by the features wherein a work holding fixture comprises a base plate and an abutment which is adjustable parallel to a plane spanned by the axes of rotation and crosswise of the direction of the axes of rotation; wherein the abutment is provided with an adjusting device; wherein a distance measurement device is provided, detecting changes in the distance of the axes of rotation; and wherein a control system is provided, which is connected to the distance measurement device on the one hand and to an actuating device for the adjusting device on the other hand; and which is embodied for triggering the actuating device in dependence on the measured changes in the distance. The gist of the invention resides in that the distance of the axes of rotation of the tool-holder spindles is measured directly or indirectly, steadily or periodically, and that a work or work holding fixture is re-adjusted, corresponding to this measurement. That may take place continuously or stepwise, namely rotatorily directly via the associated tool-holder spindle or by tracing operation.

Further features, advantages and details of the invention will become apparent from the ensuing description of exemplary embodiments, taken in conjunction with the drawing.

DESCRIPTION OF PREFERRED EMBODIMENTS

Figure 1:
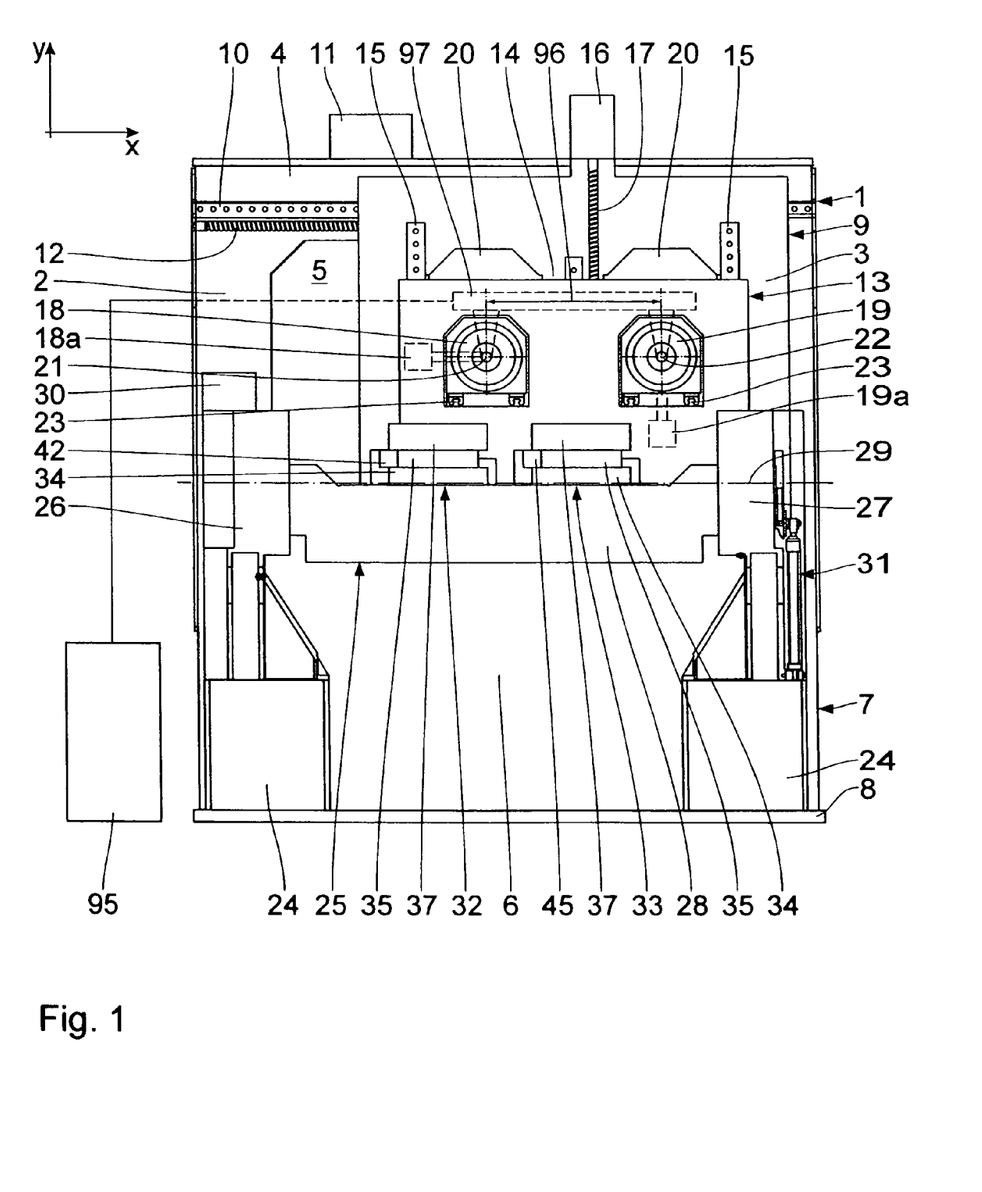
FIG. 1 is an elevation of the machine tool according to the invention.

The machine tool seen in FIG. 1 is a double-spindle machine tool with a rectangular frame 1 configured by vertical side props 2, 3 which extend in a y direction, and a horizontal, top crossbeam 4 and a bottom crossbeam (not shown) each of which extending in an x direction and uniting the side props 2, 3. The side props 2, 3 and the crossbeams 4 envelop an interior 5 which is open bilaterally, in particular towards the working area 6. The frame 1 supports itself via a subframe 7 on a foundation plate 8.

On the front end, turned towards the working area 6, of the frame 1, provision is made for an equally frame-type x skid 9 which is displaceable in the x direction. To this end, an x guide rail 10 is mounted on each crossbeam 4, with the x skid 9 being guided thereon. Actuation of the x skid 9 takes place by an x motor 11 by way of an x ball screw 12 which extends in the x direction and is housed against rotation in the side props 2, 3 of the frame 1.

Guided on the front end, turned towards the working area 6, of the x skid 9 is a y skid 13 which is vertically displaceable in a y direction. To this end, a y guide rail 15 is respectively mounted on the lateral areas and a vertical central rib 14 of the frame-type x skid 9, with the y skid 13 being displaceable thereon. Actuation of the y skid 13 takes place by a y motor 16, which is mounted on the x skid 9, by way of a y ball screw 17.

Two tool-holder spindles 18, 19 are located at a distance from each other on the y skid 13, running in a z direction forwards to the working area 6, and backwards through the inner clearance zones 20 of the x skid 9 into the interior 5 of the frame 1. The tool-holder spindles 18, 19 are rotarily drivable about z axes of rotation 21, 22, which extend in the z direction, by way of a drive motor 18a (roughly outlined). The tool-holder spindles 18, 19 are stationary one in relation to the other in the x and y direction on the y skid; they are however displaceable in the z direction on z guide rails 23 by means of a respective z motor 19a (roughly outlined).

A work carrier bed 24 is located on the foundation plate 8 in the working area 6 in front of the frame 1, supporting a work carrier 25. The work carrier 25 is a kind of a bridge which has lateral cheeks 26, 27 that support themselves on the work carrier bed 24, with a pivoted carrier 28 being mounted thereon, pivoted about a pivoting axis 29 that runs in the x direction. Pivoting actuation takes place by means of a pivoting motor 30.

On the end, turned away from the pivoting motor 30, of the pivoted carrier 28 i.e., in the vicinity of the lateral cheek 27 that is allocated to that end, a torsion-compensation device 31 engages with the pivoted carrier 28, exercising a substantially constant load in any position.

Mounted on the pivoted carrier 28 are two work holding fixtures 32, 33 which may be y rotary tables.

The machine tool described so far is known from European patent application 03 023 017.1. As for further details, in particular regarding the design of the torsion-compensation device 31, reference can be made thereto.

The work holding fixtures 32, 33 each comprise a base plate 34 which is mounted on the pivoted carrier 28 and on which is located a work carrier plate 35. As seen substantially in FIG. 2, the substantially cuboid work carrier plate 35 comprises a bearing surface 36 for a work 37. It is provided with two index tabs 38 which project from the bearing surface 36 in the y direction and which engage with index bores of equal diameter that are provided in the reference surface, turned towards the bearing surface 36, of the work 37, whereby the position of the work 37 in relation to the work carrier plate 35 is determined by a plane that is defined by the bearing surface 36. The work 37 is clamped against the bearing surface 36 of the work carrier plate 35 by means of fastening screws (not shown).

Figure 2:
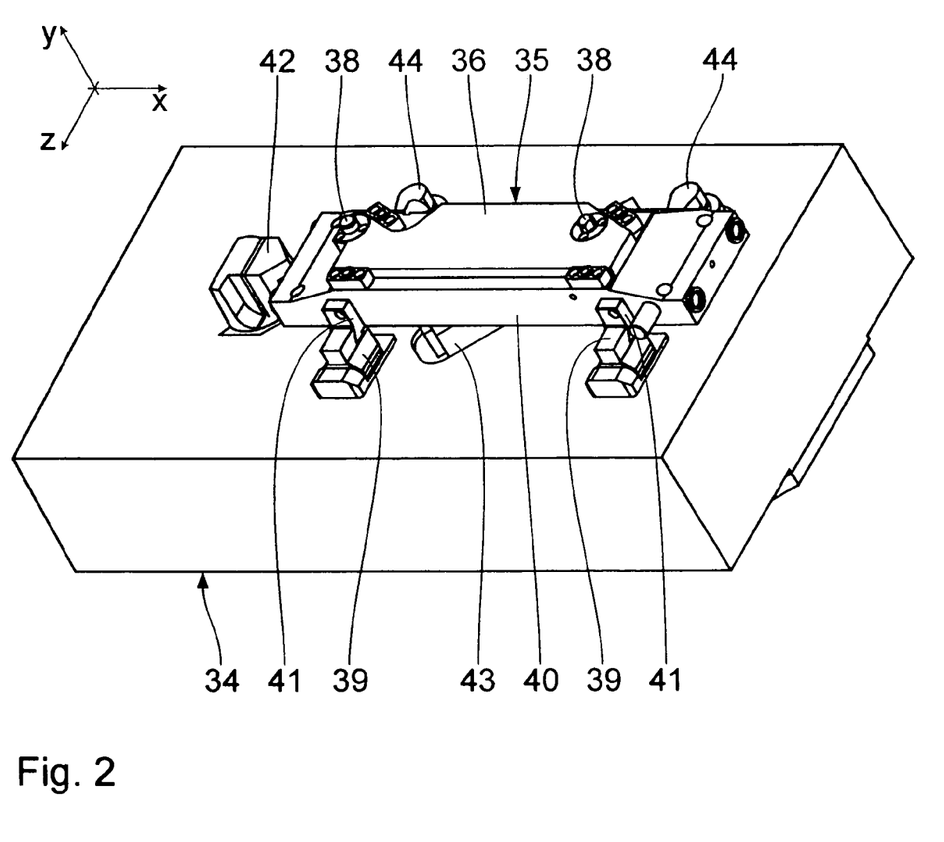
FIG. 2 is a perspective view of a base plate with a work carrier plate of the machine tool.

The carrier plate 35 and the base plate 34 are provided with devices which enable a connection between the base plate 34 and the work carrier plate 35 to be implemented rapidly and with positional accuracy so that the work 37, when transported together with the carrier plate 35 from a machine tool to another machine tool that is linked thereto and from there to yet another interlinked machine tool, will have an accurately defined position in relation to each machine tool after the work carrier plate 35 has been fixed to an identical base plate 34 that is allocated to each machine tool.

To this end, the base plate 34 is provided with two holding elements 39 of identical design to which are allocated counterpart holding elements 41 that are mounted on the side 40, turned thereto, of the carrier plate 35. By the holding elements 39 and the counterpart holding elements 41 being designed correspondingly, the carrier plate 35, when pressed against the holding elements 39, is defined in its position in the z direction and forced downwards in the y direction.

An abutment 42 is mounted on the base plate 34 which the work carrier plate 35 bears against, accurately positioned in the x direction.

Between the base plate 34 and the carrier plate 35 provision is made for a skew fixture 43 on the base plate 34, the skew fixture 43 acting in the x-z plane at an angle to the x direction and to the z direction and, upon corresponding actuation, forcing the carrier plate 35 against the holding elements 39 as well as against the abutment 42. On the side of the carrier plate 35 that is opposite the side 40, hold-down fixtures are provided on the base plate 34, by means of which the carrier plate 35 is held down on the base plate 34.

The base plate 34 and the work carrier plate 35, as far as described above, are known from U.S. Pat. No. 6,619,641 B2, which reference is made to for further details.

Figure 3:
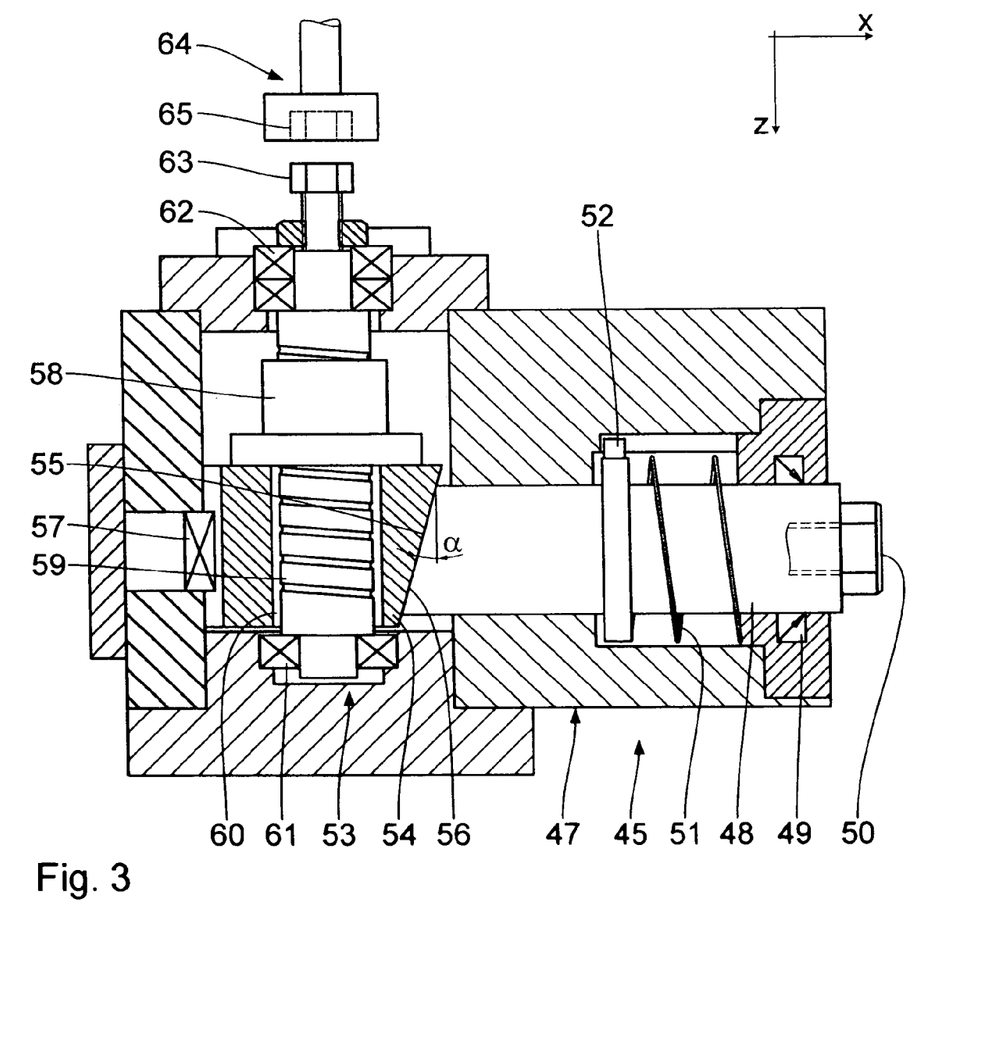
FIG. 3 is an illustration of an adjustable abutment for the work carrier plate.
Figure 4:
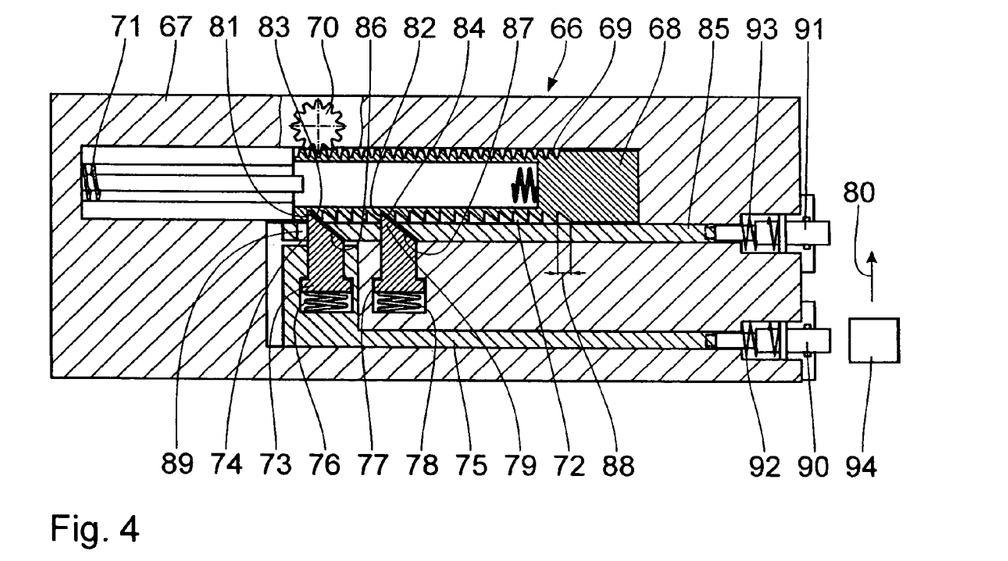
FIG. 4 is an illustration of a driving mechanism for the adjustable abutment.

In case of the work holding fixture 32 seen on the left in FIG. 1, the abutment 42 is stationary in the x direction in accordance with the illustration of FIG. 2—although manually adjustable if necessary—whereas in case of the work holding fixture 33 seen on the right of FIG. 1, an abutment 45 is provided which is finely adjustable in the x direction and embodiments of which are seen in FIGS. 3 and 4.

The abutment 45 seen in FIG. 3 comprises a multipart casing 47 in which an abutment structure 48 of the type of a bolt is mounted for displacement in the x direction and dustproofed by means of a seal 49. On its end that projects from the casing 47, the structure 48 comprises a stop surface 50 which bears against the work carrier plate 35 i.e., the work carrier plate 35 supports itself thereon in the x direction. The abutment structure 48 is pressed by a pre-loaded helical compression spring 51 into its position as far as possible inside the casing 47. By means of a safeguard against rotation 52, the abutment structure 48 is non-rotarily mounted in the casing 47 i.e., it is displaceable only in the x direction and is otherwise free from backlash in the y and z direction in the casing 47.

At the end, opposite the stop surface 50, of the abutment structure 48, an adjusting device 53 is provided in the casing 47. It comprises an adjusting structure 54 which, by means of a wedge surface 55, bears against a counterpart wedge surface 56 that is formed on the end, located in the casing 47, of the abutment structure 48. The adjusting structure 54 is lodged in the casing 47 for displacement in the z direction i.e., vertically of the x direction that defines the direction of displacement of the abutment structure 48. By means of a safeguard against rotation 57 it is mounted non-rotarily in the casing 47 and supported in a manner free from backlash in the x and y direction.

The adjusting structure 54 forms one piece with, or is joined to, a spindle nut 58, in any case non-rotarily, through which a threaded spindle 59 passes in the z direction. To this end, the adjusting structure 52 has a through hole 60. By means of bearings 61, 62, the spindle 59 is mounted in the casing 47 immovably in its longitudinal direction i.e., in the z direction, but otherwise freely rotatably. For rotary actuation of the spindle 59, a polygonal section 63 is formed on the end thereof that is outside the casing 47 and turned towards the tool-holder spindle 19.

By rotation of the spindle 59, the wedge surfaces 55, 56 move one in relation to the other substantially in the z direction, whereby the abutment structure 48, together with the stop surface 50, is displaced in the x direction. With the wedge angle a in relation to the z direction i.e., in relation to the direction of displacement of the adjusting structure 54, being very small, there is a self-locking effect between the adjusting structure 54 and the abutment structure 48 i.e., no displacement of the abutment structure 48 can take place owing to the high pressure that acts between the carrier plate 35 and the abutment structure 48. Correspondingly, this is also true for the drive that is formed by the spindle 59 and the spindle nut 58, which is also self-locking. With the wedge angle a being very small, there is simultaneously a reduction of the motion of the adjusting structure 54 in the z direction to the motion of the abutment structure 48 in the x direction.

Adjustment of the adjusting structure 54 by rotation of the spindle 59 takes place by way of a tool 64 with a polygonal socket section 65 which is complementary of the polygonal section 63 and which is formed in the way of a socket wrench. For respective regulation of the stop surface 50 and thus of the work carrier plate 35 in the x direction, the tool 64 is received in the tool holder spindle 19 and driven thereby. By corresponding displacement of the x skid 9 and the y skid 13 and of the tool-holder spindle 19 in the z direction, the polygonal socket section 65 of the tool 64 is engaged with the polygonal section 63, whereupon the described adjustment takes place. These designs enable to stop surface 50 to be continuously adjusted in the x direction.

In the embodiment according to FIG. 4, the spindle 59 is driven by a drive mechanism 66 that is independent of the tool holder spindle 19. This mechanism 66 comprises a casing 67 which extends substantially in the direction of the abutment structure 48 i.e., in the x direction, and in which a drive structure 68 is disposed for displacement in the x direction, the drive structure 68 being oblong and largely hollow. Its top side is provided with a drive indentation 69 with which engages a pinion 70 that is coupled with the spindle 59. The hollow drive structure 68 is pressed into a position—to the right in FIG. 4—by means of a pre-loaded helical compression spring 71.

On the bottom side that is opposite to the drive indentation 69, the drive structure 68 is provided with locking teeth 72. A latch-type adjusting element 73, which is located crosswise of the x-directed direction of displacement of the drive structure 68—which is the y direction in the drawing-engages with these locking teeth by a catching projection 74. The adjusting element 73 is lodged for displacement in an adjusting slide 75 which is displaceable in the casing 67 in the direction of displacement of the drive structure 68 and it is pressed against the locking teeth 72 by means of a pre-loaded compression spring 76. In vicinity to the adjusting element 73, a likewise latch-type locking element 77 is displaceably lodged in the casing 67 and also loaded by means of a compression spring 78 in a direction towards the locking teeth 72 which it engages with by a locking projection 79. The locking teeth 72, the catching projection 74 of the adjusting element 73 and the locking projection 79 of the locking element 77 are complementary of one another. They have a respective holding surface 81, 82 that extends in the direction of displacement 80 of the elements 73, 77 and a sliding surface 83 and 84, respectively, which is askew thereof.

In vicinity to the locking teeth 72 and parallel to the direction of displacement of the drive structure 68, which runs in the x direction, an unlatching rod 85 is displaceably lodged in the casing 67. It has an unlatching surface 86 which cooperates with the sliding surface 83 of the adjusting element 73 and another unlatching surface 87 which cooperates with the sliding surface 84 of the locking element 77. Upon displacement of the unlatching rod 85 into the casing 67, the adjusting element 73 as well as the locking element 77 are disengaged from the locking teeth 72.

Upon actuation of the adjusting slide 75 into the casing 67, the adjusting element 73 entrains the drive structure 68, whereas the locking element 77 is forced out of the locking teeth 72 and then locks into place again. Consequently, the drive structure 68 can be adjusted stepwise, corresponding to the spacing of the teeth 88 of the drive indentation. This stepwise adjustment is transferred via the pinion 70 to the spindle 59, leading to stepwise adjustment of the stop surface 50, with the respective steps of adjustment of the stop surface 50 being dimensioned in the range of 1 μm. For the unlatching rod 85 not to be entrained by the adjusting element 73 upon actuation of the adjusting element 73 for adjustment of the spindle 59, a sufficiently sized recess 89 is provided in the unlatching rod 85 upstream of the adjusting element 83 in the direction of displacement.

The adjusting slide 75 as well as the unlatching rod 85 project from the casing 67, there having operating pins 90 and 91, respectively. They are loaded by compression springs 92, 93 pressing them into their position of rest, in which the operating pins 90, 91 take their position of farthest projection from the casing 67.

Actuating the adjusting element 73 and the unlatching rod 85 also takes place via the tool-holder spindle 19 by means of an operating element 94 which is clamped in the spindle 19 and then, with the tool-holder spindle 19 at a standstill, moved in front of one of the operating pins 90 and 91 by displacement in the x-y and z direction. By displacement in the x direction the operating pin 90 or 91 is then operated. This operating element 94 may also be fixed to the tool holder spindle 19. When the tool 64 or the operating element 94 are clamped in the tool-holder spindle 19, they can be deposited in a tool magazine that is mounted on the machine tool. Lots of configurations of that type have been known for example from EP 0 806 998 B1, U.S. Pat. No. 6,071,220 and WO 2004/091852 A1 to which reference is made. Triggering the described adjusting jobs takes place via the control system 95 of the machine tool. At regular intervals of for example few minutes, the control system 95 receives information on the distance 96 of the z axes of rotation 21, 22 of the tool-holder spindles 18, 18. This measurement is transmitted to the control system 95 by a distance-measurement device 97 that is located in the machine tool. The control system 95 compares the actual distance 96 to a stored desired value, setting this actual value again to the desired value by corresponding adjustment as described above.

In as much as the second embodiment according to FIGS. 5 to 9 is identical with the first embodiment according to FIGS. 1 to 4, there is no need of renewed description; the same reference numerals are used in the drawings. In as much as functionally identical parts are used that slightly differ constructionally, the same reference numerals are used as in FIGS. 1 to 4, however provided with a prime. In this regard, too, there is no need of renewed description.

Figure 5:
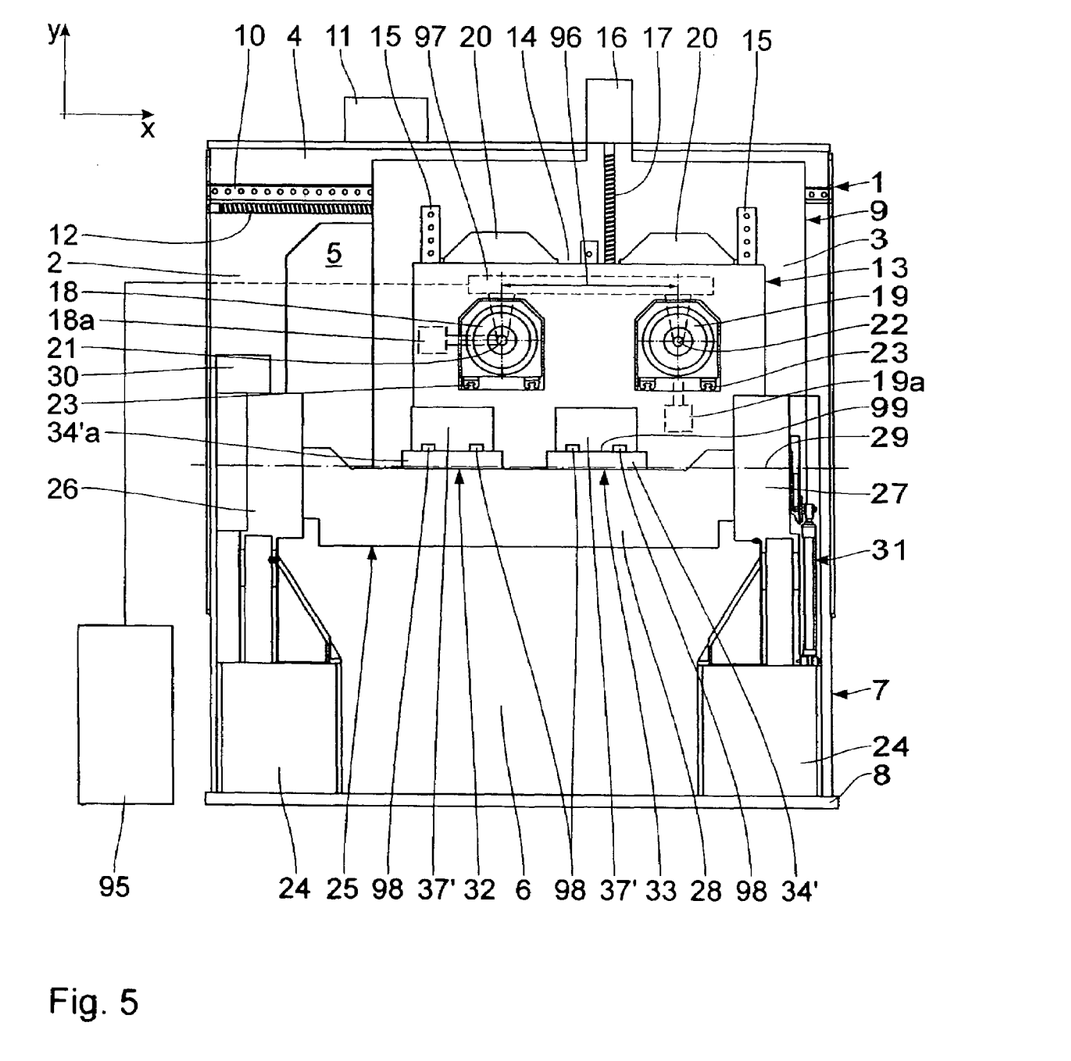
FIG. 5 is an elevation of an embodiment, modified as compared to FIG. 1, of a machine tool according to the invention.
Figure 6:
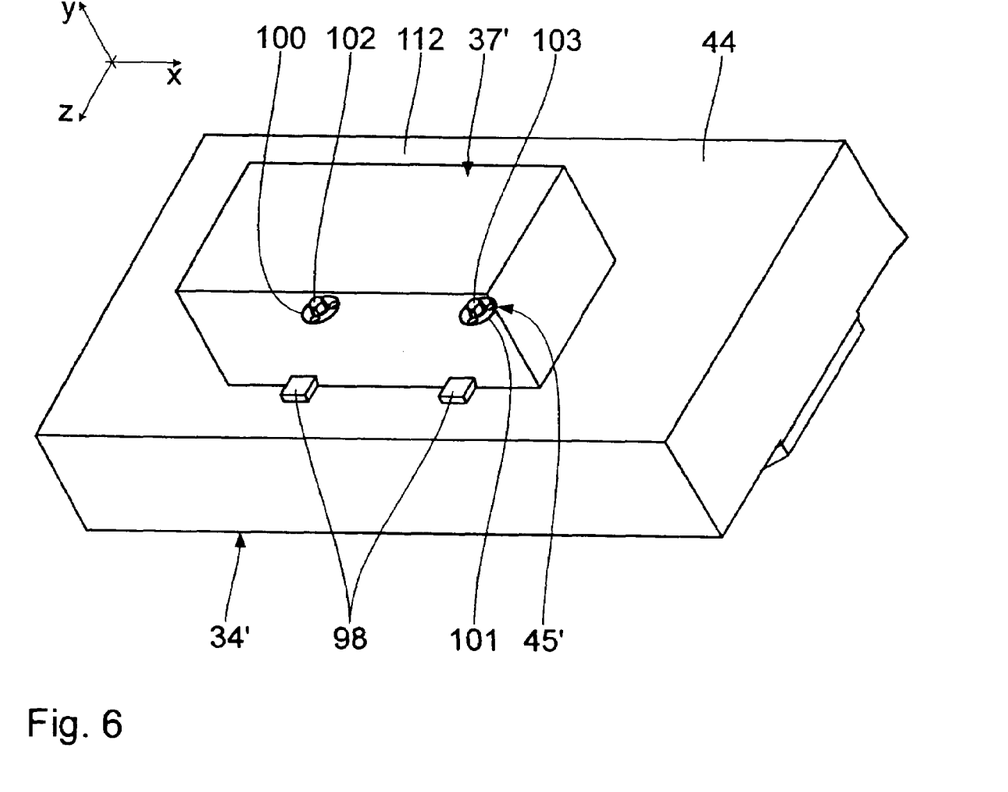
FIG. 6 is a perspective view of a base plate of the machine tool of FIG. 5 with a work fixed.

As seen in FIG. 5, base plates 34', 34'a are disposed on the pivoted carrier 28, works 37' being fixed thereto directly by clamping fixtures 98. The work carrier plates 35 and, correspondingly, the abutments 42, 45 of the first embodiment do not exist. Two centering bores 100, 101 are formed on the bottom side 99 of the work 37' that rests on the base plate 34'. A so-called sword-type bolt 102 in the form of a slim rhombus which is formed on the base plate 34'—as seen in FIG. 6—engages with one centering bore 100. An index bolt 103 which is mounted eccentrically on the setting shaft 104 and adapted to the centering bore 101, being free from clearance, engages with the other centering bore 101. This index bolt 103 and the setting shaft 104 constitute an adjustable abutment 45'. The setting shaft 104 constitutes an abutment structure 48'. The index bolt 103 and the sword-type bolt 102 serve for aligning the work 37' in the x direction.

Figure 7:
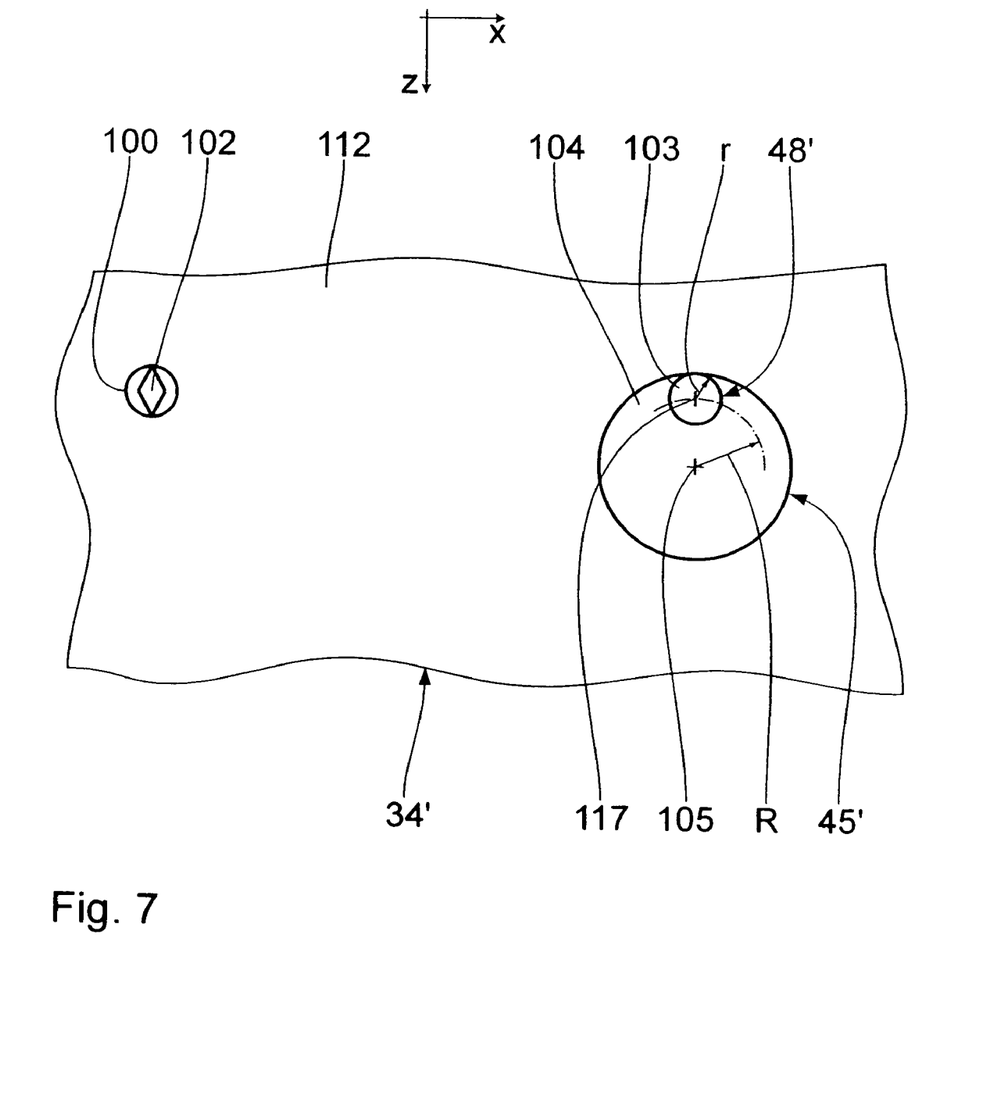
FIG. 7 is a plan view of the base plate of FIG. 6.
Figure 8:
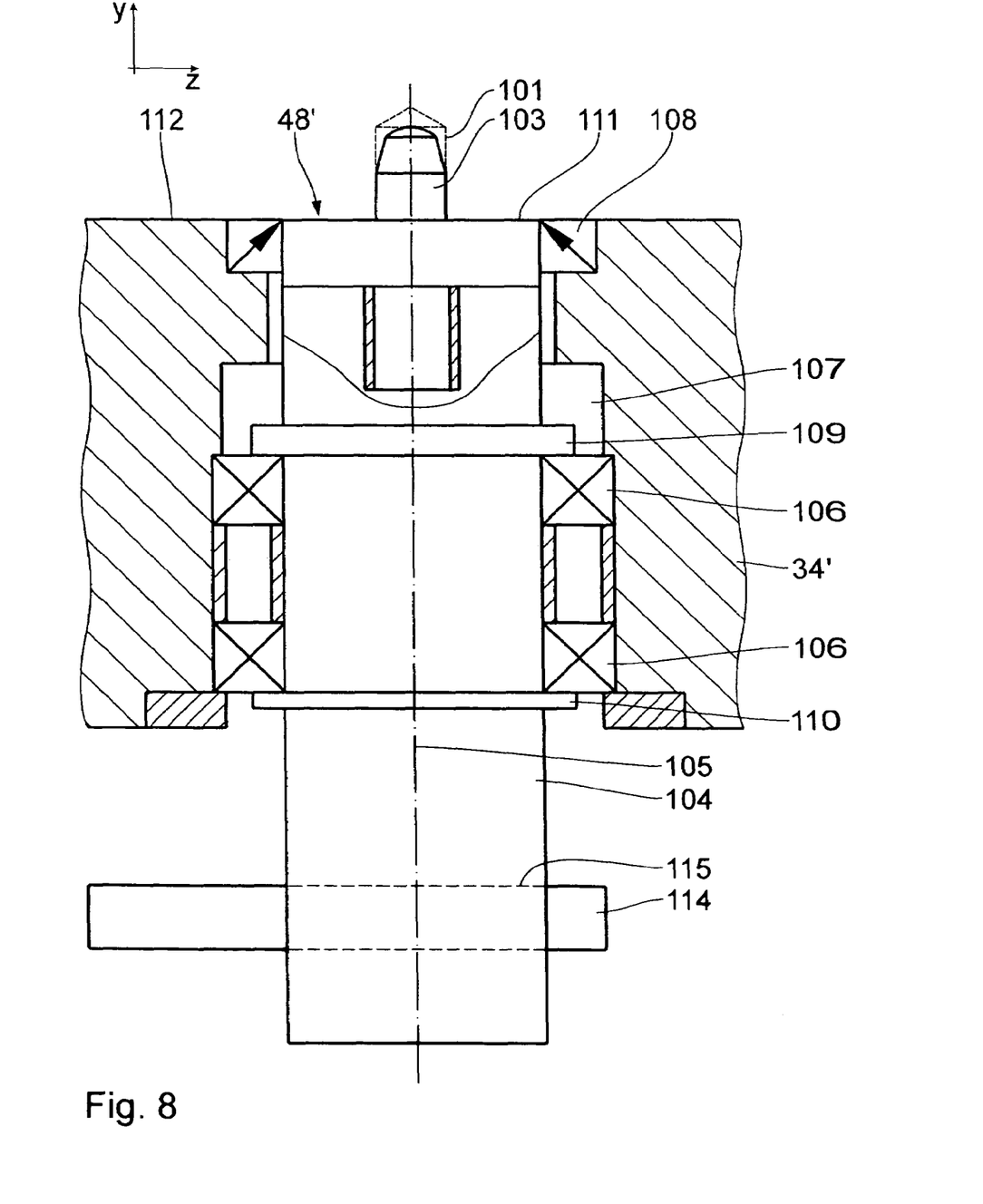
FIG. 8 is a cross-sectional view of the base plate of FIG. 6 in the vicinity of an adjustable abutment.

As seen in FIGS. 7 and 8, the setting shaft 104 lodges in the base plate 34', pivoting about its central longitudinal axis 105 which extends in the y direction. The setting shaft 104 is housed by means of bearings 106 in a corresponding recess 107 of the base plate 34' and sealed by a seal 108 towards the respective work 37'. Fixing the setting shaft 104 axially takes place by means of an annular collar 109 that is formed on the setting shaft 104 and by means of a Seeger circlip ring 110 that is releasably fixed to the setting shaft 104. The annular collar 109 and the Seeger ring 110 bear against the bearings 106. The setting shaft 104 ends by its top front end 111 in alignment with the top side 112 of the base plate 34'. The index bolt 103, which is formed on the front end 111, therefore stands out upwards from the base plate 34' in the y direction.

Figure 9:
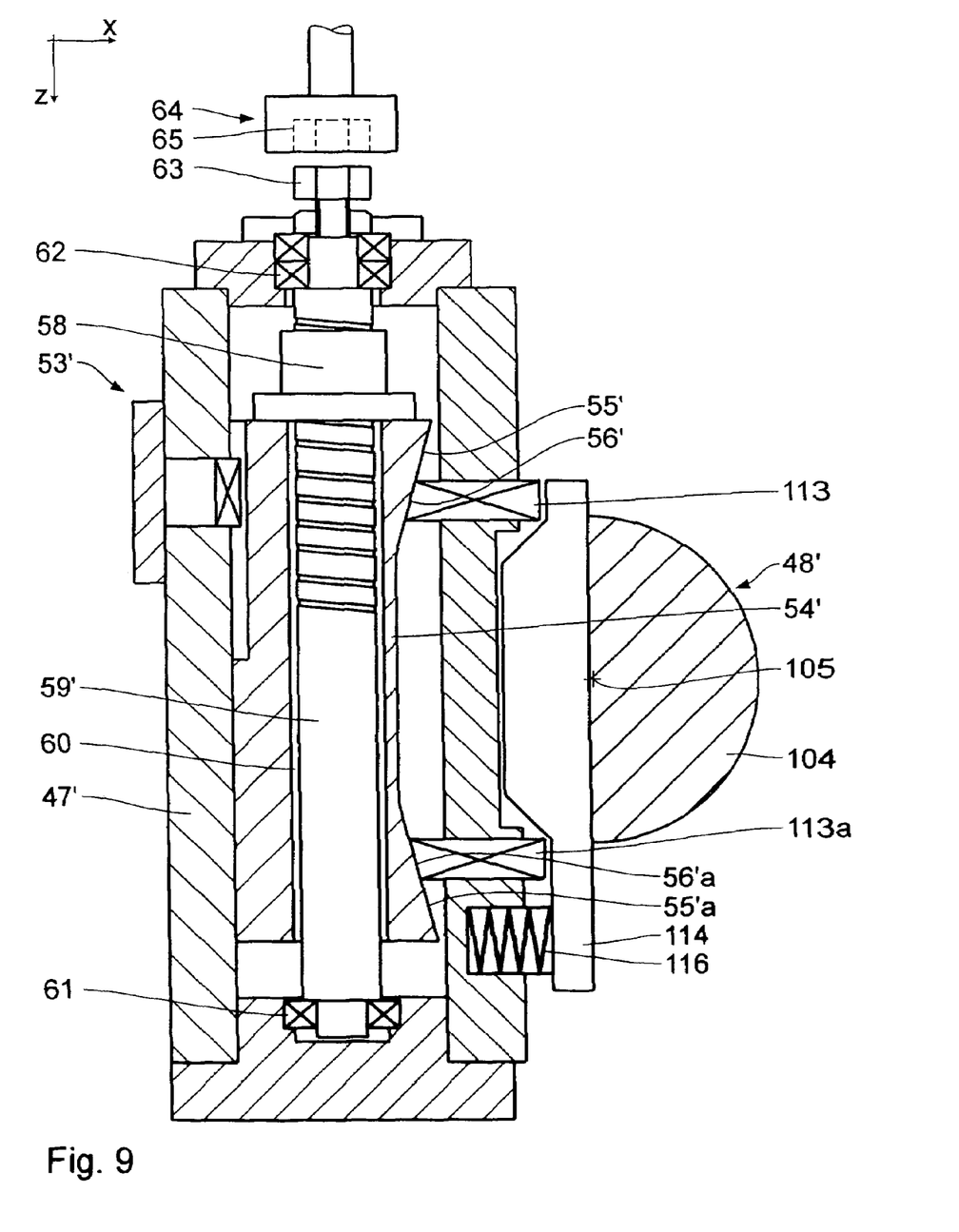
FIG. 9 is a cross-sectional view of an adjusting device for the abutment of FIG. 8.

Operating the setting shaft 104 takes place by means of an adjusting device 53' which is similar to the adjusting device 53 of FIG. 3. An adjusting structure 54' is joined to the threaded spindle 59', having two wedge surfaces 55', 55'a which incline towards each other in opposite directions. These wedge surfaces 55', 55'a rest on counterpart wedge surfaces 56', 56'a of actuating tappets 113, 113a. They rest again on a rocker 114 approximately in the form of a rod which is fixed in a corresponding recess 115 of the setting shaft 104. Disposed in the casing 47' is a pre-loaded helical compression spring 116 which bears against the rocker 114 in vicinity to the actuating tappet 113a and presses the rocker 114 against the actuating tappet 113, thus removing any possible backlash from this system. Upon rotation of the threaded spindle 59', the adjusting structure 54' is moved in the z direction, as a result of which the setting shaft 104 again pivots about its axis 105 that extends in the y direction. This pivoting motion leads to the index bolt 103 being displaced predominantly in the x direction and only negligibly in the z direction. This displacement, per se undesired, of the index bolt 103 in the z direction i.e., crosswise of the desired displacement in the x direction, is negligible with the setting shaft 104 pivoting about its axis 105 in the range of maximally ±10°. Thus a motion of the work 37' in the x direction by up to 0.2 mm is possible. The design of the sword-type bolt 102 permits displacements in the x direction by this amount, because the sword-type bolt 102, due to its described slim shape, does not entirely fill the centering bore 100 in the x direction; it rests on the centering bore 100 only in the z direction by minor backlash. The radius r of the bores 100, 101 and of the index bore 103 is in the range of 2.5 to 3.0 mm. The reference radius R of the setting shaft 104 from the axis 105 as far as to the central axis 117 of the index bolt 103 is in the range of 15 to 20 mm. The reference radius R corresponds to the eccentricity of the index bolt 103 in relation to the axis 105.

Operating the adjusting device 53' takes place in the same way as explained above in connection with FIG. 3. By the described setting of the work 37', seen on the right in FIG. 5, in the x direction as compared to the work 37' seen on the left in FIG. 5, any modifications of the distance 96 of the tool-holder spindles 18, 19 from each other is compensated. Aligning the work 37' is of course effected while the clamping fixtures 98 are not yet fixed. Clamping the work 37' takes place only after the alignment.

What is claimed is:

1. A double-spindle machine tool, comprising
   a frame (1);
   two tool-holder spindles (18, 19),
      which have parallel axes of rotation (21, 22) that are disposed at a distance (96) from one another;
   two work holding fixtures (32, 33; 32', 33') for accommodation of a respective work (37; 37');
   devices for displacement of the works (37; 37') relative to the tool-holder spindles (18, 19);
   wherein a work holding fixture (33; 33') comprises
      a base plate (34, 34') and
      an abutment (45; 45') which is adjustable parallel to a plane spanned by the axes of rotation (21, 22) and crosswise of the direction of the axes of rotation (21, 22);
   wherein the abutment (45; 45') is provided with an adjusting device (53, 53');
   wherein a distance measurement device (97) is provided, detecting changes in the distance (96) of the axes of rotation (21, 22); and
   wherein a control system (95) is provided,
      which is connected to the distance measurement device (97) on the one hand and
      to an actuating device for the adjusting device (53; 53') on the other hand; and
      which is embodied for triggering the actuating device in dependence on the measured changes in the distance.

2. A double-spindle machine tool according to claim 1, wherein the abutment (45; 45') comprises an abutment structure (48; 48') which is adjustable crosswise of the direction of the axes of rotation (21, 22).

3. A double-spindle machine tool according to claim 2, wherein the adjusting device (53; 53') comprises a spindle nut drive (59, 58; 59') which is coupled with the abutment structure (48; 48') and which is operable by the actuating device.

4. A double-spindle machine tool according to claim 3, wherein a transfer device is disposed between the spindle nut drive (59, 58; 59') and the abutment structure (48; 48'), having a wedge surface (55; 55'; 55'a) and a counterpart wedge surface (56; 56', 56'a).

5. A double-spindle machine tool according to claim 1, wherein the adjusting device (53; 53') is self-locking.

6. A double-spindle machine tool according to claim 1, wherein the adjusting device (53; 53') is continuously operable directly by a tool (64) that is rotarily drivable by the associated tool-holder spindle (19).

7. A double-spindle machine tool according to claim 1, wherein the adjusting device (53; 53') is stepwise operable by a separate drive mechanism (66).

8. A double-spindle machine tool according to claim 7, wherein the drive mechanism (66) comprises a drive structure (68) which is displaceable in a direction of displacement, having a drive indentation (69) for operation of the adjusting device (53) and locking teeth (72) which engage releasably with an adjusting element (73) and a locking element (77).

9. A double-spindle machine tool according to claim 8, wherein the adjusting element (73) is lodged in an adjusting slide (75) which is displaceable in the direction of displacement of the drive structure (68).

10. A double-spindle machine tool according to claim 9, wherein the adjusting element (73) and the locking element (77) are mounted crosswise of the direction of displacement of the drive structure (68).

11. A double-spindle machine tool according to claim 10, wherein an unlatching element (85) is provided, which is coupled with the adjusting element (73) and the locking element (77) and upon displacement of which the adjusting element (73) and the locking element (11) are disengaged from the drive structure (68).

12. A double-spindle machine tool according to claim 11, wherein the adjusting slide (75) and the unlatching element (85) are operable by the associated tool-holder spindle (19).

13. A double-spindle machine tool according to claim 1, wherein a work carrier plate (35) is disposed on the base plate (34), holding a work (37); and
wherein the work carrier plate (35) supports itself on the abutment (45).

14. A double-spindle machine tool according to claim 2, wherein the abutment structure (48') is a setting shaft (104), which is connectable to a work (37') by an index bolt (103) that is disposed eccentrically of its central longitudinal axis (105) and
which is pivotable about its central longitudinal axis (105) by the adjusting device (53').

15. A double-spindle machine tool according to claim 14, wherein the adjusting device (53') comprises an adjusting structure (54') which has two wedge surfaces (55', 55'a) which incline in opposite directions and which bear against a respective counterpart wedge surface (56', 56'a) of two actuating tappets (113, 113a) which in turn rest on a rocker (114) that is connected to the setting shaft (104).

16. A double-spindle machine tool according to claim 15, wherein a pre-loaded spring (116) acts on the rocker (114).

17. A double-spindle machine tool according to claim 14, wherein an adapted first centering bore (101) in the work (37') is allocated to the index bolt (103).

18. A double-spindle machine tool according to claim 17, wherein the base plate (34') comprises a sword-type bolt (102) for engagement with a second centering bore (100) of the work (37').

* * * * *